March 24, 1936.  O. H. MORGAN  2,034,876

FERTILIZER DISTRIBUTOR

Filed April 29, 1935

INVENTOR
O. H. Morgan
BY
ATTORNEY

Patented Mar. 24, 1936

2,034,876

UNITED STATES PATENT OFFICE 2,034,876

FERTILIZER DISTRIBUTOR

Otto H. Morgan, Middle River, Calif.

Application April 29, 1935, Serial No. 18,856

1 Claim. (Cl. 221—128)

This invention relates generally to agricultural implements and is directed particularly and specifically to a fertilizer distributing device.

In distributing fertilizer on the ground from an agricultural implement moving over the ground, it is imperative that a metered discharge and distribution of fertilizer be provided in order to assure efficient as well as economical fertilization.

It is therefore one of my objects to provide a simple and yet effective device to so distribute the fertilizer; such device comprising essentially a sprocket and endless chain structure, each link of the chain being provided with a conveyer plate as will hereinafter appear.

In the operation of such a fertilizer distributing device however a serious problem arises when ordinary sprocket wheels are employed. The fertilizer, especially when slightly damp, tends to adhere to the sprocket wheel between the teeth at the root line thereof and when a sufficient layer of fertilizer builds up, the links of the chain cannot properly engage against the teeth resulting in breakage of the chain.

To overcome this objectionable feature it is my object to provide a novel sprocket wheel designed to prevent such accumulation of fertilizer between the teeth of the sprocket wheel.

These objects I accomplish by means of such structure and relative arrangement of parts as will fully appear by a perusal of the following specification and claims.

In the drawing similar characters of reference indicate corresponding parts in the several views.

Figure 1:
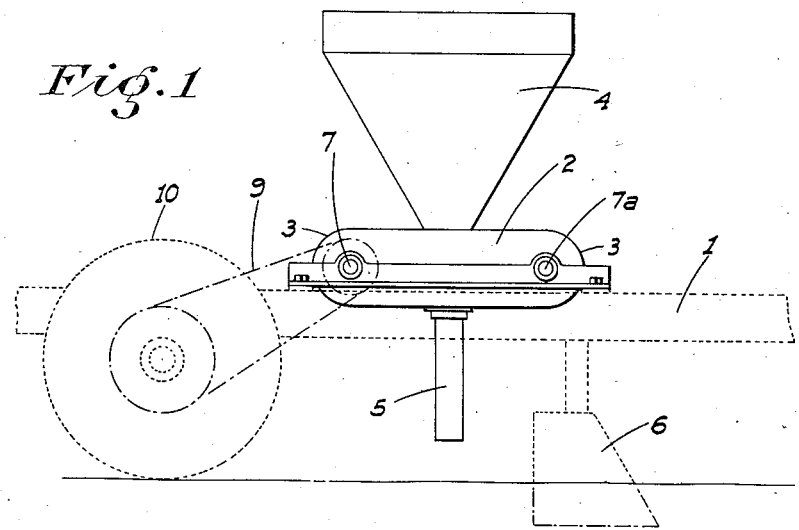
Figure 1 is a side elevation of my fertilizer distributor illustrating in dotted lines an implement upon which it is mounted.
Figure 2:
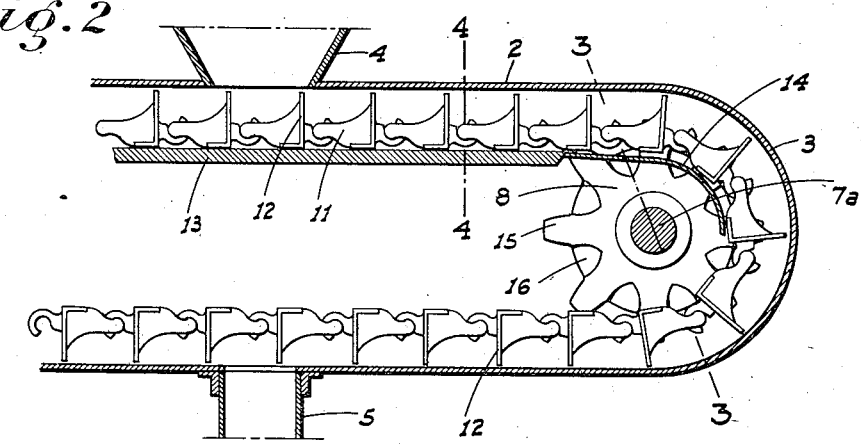
Figure 2 is a fragmentary enlarged longitudinal section of the distributor illustrating the sprocket and chain mechanism and adjacent structure.
Figure 3:
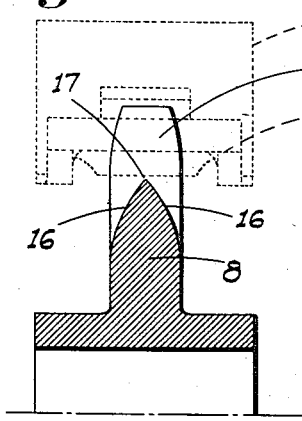
Figure 3 is a radial section of one of the sprocket wheels as on line 3—3 of Figure 2.
Figure 4:
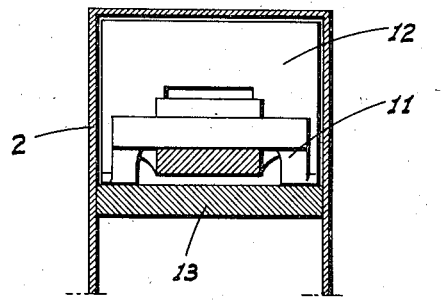
Figure 4 is a transverse section taken on line 4—4 of Figure 2.

Referring now more particularly to the characters of reference on the drawing, the numeral 1 denotes the frame of an agricultural implement upon which the fertilizer distributor device may be secured in any preferred manner. This device comprises an elongated housing 2 of rectangular form in cross-section but which is semi-circular at each end as at 3. Mounted above the housing and discharging into the same intermediate the ends thereof is a hopper 4.

Depending from the housing from a point substantially beneath the hopper 4 is a discharge tube 5, adapted to distribute the fertilizer over the surface of the ground or immediately behind a plow or other tool 6.

Journaled in the housing at each end on transverse shafts 7 and 7a are spaced sprocket wheels 8. The sprocket shaft 7 is extended beyond the housing and is indicated generally at 9. It is driven by any suitable means from one of the wheels 10 of the implement.

An endless chain comprising links 11 extends between and about the sprockets 8 in driven relation, each separate link of the endless chain being formed with an outwardly projecting conveyor plate 12 which is of sufficient size to substantially fill the space within the housing outwardly of the inner edge of the chain.

Mounted below but immediately adjacent the upper reach of the chain intermediate the sprockets is a baffle floor plate 13 on which the chain drags and which prevents the fertilizer from falling past the chain as the fertilizer is discharged from the hopper. This plate 13 has spaced fingers 14 which extend out from the end of the plate along the sides of the driven sprocket and concentric with the housing to a point in a plane with the center of the shaft 7. These fingers further prevent the fertilizer from undue discharge from the upper to the lower reach of the chain.

In operation, fertilizer is placed in the hopper of the agricultural implement and as the implement moves, allowed to discharge into the housing where it is immediately picked up and conveyed by means of the driven chain and conveyer plates to the discharge tube opening in the bottom of the housing. By using a link chain and conveyer plates housed in as described and driven from a wheel of the implement, only a certain amount of fertilizer may be discharged from the device for any given distance traveled. In other words, the flow of fertilizer from the discharge tube is metered. Also, great simplicity and cheapness of construction is had.

Such operation however is often interrupted by breakage of the chain unless some provision is made to prevent the fertilizer from caking and building up as a layer between the teeth at the root line thereof—which eventually will part the chain due to the fact that the links cannot properly seat on the sprocket teeth.

To overcome this difficulty I converge the sides 16 of the sprocket, between the teeth, together from opposite sides to form centrally located and sharp edges 17 which are disposed in the plane of the root line of the teeth.

By so forming the sprocket wheels and removing the usual relatively wide ledge between the teeth, it is impossible for any substantial amount of the fertilizer to accumulate between the teeth with the aforementioned undesirable result. The sharp edges 17 cut away any accumulation of caked fertilizer on the under portion of the chain and the fertilizer sheds off the sides 16 there being no ledge against which the fertilizer can pack. Thus breakage of the endless chain is positively eliminated.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

A fertilizer distributor comprising a pair of horizontally spaced sprockets, an endless chain about said sprockets, means to rotate one sprocket to move the upper run of the chain in a certain direction, plates projecting outwardly from the chain and being wider than said sprockets, a floor under the upper run of the chain between the sprockets and on which said chain and the inner edges of the plates drag, flat fingers extending as a continuation of one end of the floor on opposite sides of the leading sprocket and curving concentric with said sprocket to a termination substantially at the horizontal center line thereof, a housing enclosing said chain and sprockets, the side walls of the housing contacting the outer edges of the floor and fingers and closely confining the side and outer edges of the chain plates, a fertilizer intake member connected to the top of the housing intermediate the sprockets, and a fertilizer outlet chute depending from the housing.

OTTO H. MORGAN.